(12) United States Patent
Hua et al.

(10) Patent No.: US 12,598,586 B2
(45) Date of Patent: Apr. 7, 2026

(54) SYSTEMS AND METHODS FOR PROVIDING OUT OF HOME REGION NOTIFICATIONS

(71) Applicant: Verizon Patent and Licensing Inc., Basking Ridge, NJ (US)

(72) Inventors: Suzann Hua, Beverly Hills, CA (US); Ye Huang, San Ramon, CA (US); Tony Ferreira, Fairfield, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 586 days.

(21) Appl. No.: 18/149,237

(22) Filed: Jan. 3, 2023

(65) Prior Publication Data

US 2024/0224232 A1 Jul. 4, 2024

(51) Int. Cl.
*H04W 60/00* (2009.01)
*H04W 68/12* (2009.01)

(52) U.S. Cl.
CPC ........... *H04W 68/12* (2013.01); *H04W 60/00* (2013.01)

(58) Field of Classification Search
CPC .............................. H04W 60/00; H04W 68/12
See application file for complete search history.

(56) References Cited

U.S. PATENT DOCUMENTS

| | | | |
|---|---|---|---|
| 12,375,888 B2 * | 7/2025 | Kim | ........................ H04W 4/08 |
| 2022/0240213 A1 * | 7/2022 | Ly | ......................... H04W 60/04 |

* cited by examiner

*Primary Examiner* — Michael T Vu

(57) ABSTRACT

A method may include receiving, from a user equipment (UE) device, a registration request and determining whether the UE device is not in a home region associated with the UE device, and whether information included in the registration request indicates that the UE device is in a different location than a location associated with a most recent registration request. The method may also include transmitting a message to a notification device, in response to determining that the UE device is not in the home region associated with the UE device and the UE device is in a different location than the location associated with a most recent registration request. The method may further include transmitting, by the notification device, notification information to the UE device.

20 Claims, 6 Drawing Sheets

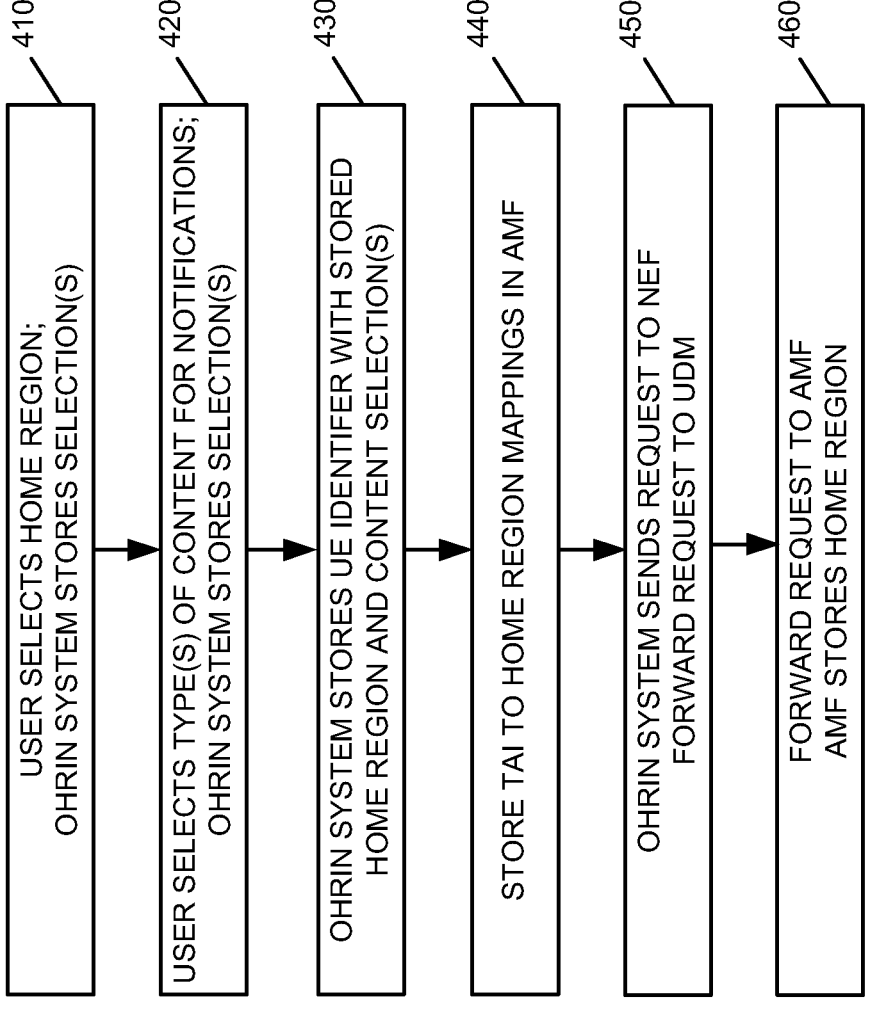

410 USER SELECTS HOME REGION; OHRIN SYSTEM STORES SELECTION(S)

420 USER SELECTS TYPE(S) OF CONTENT FOR NOTIFICATIONS; OHRIN SYSTEM STORES SELECTION(S)

430 OHRIN SYSTEM STORES UE IDENTIFER WITH STORED HOME REGION AND CONTENT SELECTION(S)

440 STORE TAI TO HOME REGION MAPPINGS IN AMF

450 OHRIN SYSTEM SENDS REQUEST TO NEF FORWARD REQUEST TO UDM

460 FORWARD REQUEST TO AMF AMF STORES HOME REGION

FIG. 4

SYSTEMS AND METHODS FOR PROVIDING OUT OF HOME REGION NOTIFICATIONS

BACKGROUND INFORMATION

Currently, Third Generation Partnership Project (3GPP) standards support some event monitoring services. For example, some events in a Fifth Generation (5G) core network may be monitored and notifications regarding the events may be provided to other devices via a network exposure function (NEF). However, such event monitoring is typically very limited.

BRIEF DESCRIPTION OF THE DRAWINGS

FIG. 4 is a flow diagram illustrating processing associated with registering to receive information notifications in accordance with an exemplary implementation;

DETAILED DESCRIPTION OF EXAMPLE EMBODIMENTS

The following detailed description refers to the accompanying drawings. The same reference numbers in different drawings may identify the same or similar elements.

Implementations described herein provide an out-of-home-region information notification (OHRIN) service that provides information of interest to a user device when the user device is located outside of a "home region" associated with the user device. In some implementations, a user may preselect types of content, such as health related information, weather or local news, governmental/legal issues, types of telecommunications services that are available or unavailable, etc., for which he/she would like to receive notifications when he/she is outside the home region (e.g., traveling for work or pleasure). In addition, the user may select the home region, such as a city, state and/or country to allow the user to tailor the notifications to particular types of locations outside the user's home region. For example, the user may wish to receive notifications when the user travels outside his/her home state (e.g., traveling domestically), and/or receive notifications when the user is outside his/her home country (e.g., traveling internationally). In each case, the OHRIN service may provide the content via messages, such as short message service (SMS) messages, email messages, etc. In this manner, the user may conveniently receive information of interest when the user is outside his/her home region.

Figure 1:
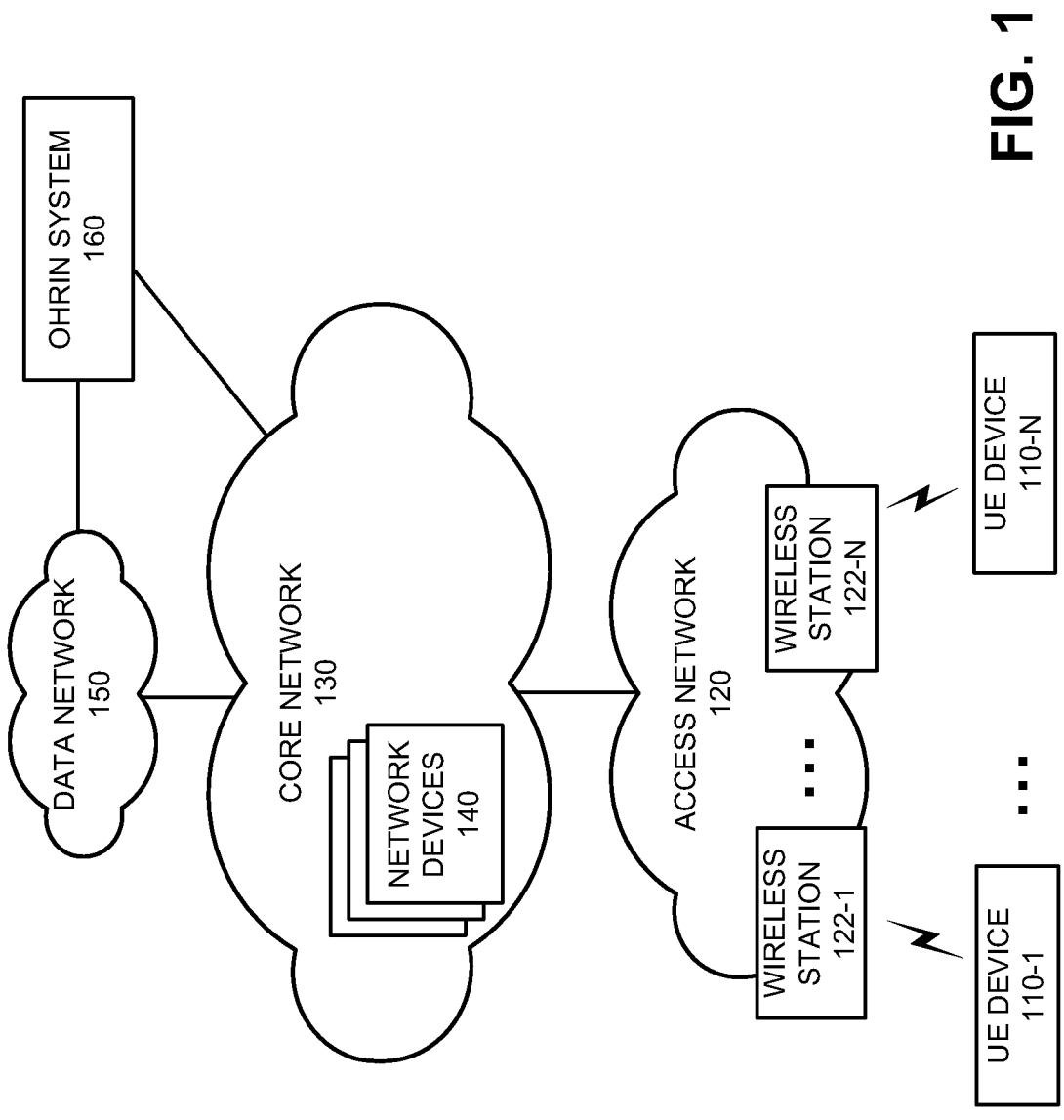
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) devices 110-1 through 110-N, access network 120, wireless stations 122-1 through 122-N, core network 130, network devices 140, data network 150 and OHRIN system 160.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an Internet of Things (IOT) device, a machine type communication (MTC) device, etc., that includes communication functionality. UE device 110-1 may connect to access network 120 via wireless station 122-1 and UE device 110-N may connect to access network 120 via wireless station 122-N. UE devices 110 may also connect to other devices in environment 100 via other techniques, such as wired, wireless, optical connections or a combination of these techniques. UE device 110 and the person associated with UE device 110 (e.g., the party holding or using UE device 110) may be referred to collectively as UE device 110 or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. Additionally, access network 120 may include functionality such as the functionality of a millimeter (mm) Wave Radio Access Network (RAN). Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IOT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include a 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNodeB)) or a 6G base station that communicates wirelessly with UEs 110 located within the radio frequency range of wireless station 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility Management Function (AMF), a Session Management Function (SMF), a Unified Data Management (UDM) function, a Unified Data Repository (UDR), a Policy Control Function (PCF), a Charging Function (CHF), a network exposure function (NEF), an application function (AF), such as an out-of-home region application function (OHRIN AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementations, network devices 140 may include combined 4G and 5G functionality, such as a session management function with PGW-control plane (SMF+PGW-C) and a user plane function with PGW-user plane (UPF+PGW-U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

OHRIN system 160 may include one or more computer devices and/or servers that obtain information, store the information, and/or provide the information to other devices in environment 100, such as UE devices 110, when the UE devices 110 are located outside their "home" regions. For example, OHRIN system 160 may obtain weather-related information for particular regions, breaking news information, health threats or conditions in particular areas, government or jurisdiction related laws in particular regions, types of telecommunication services available or not available in particular regions, etc. OHRIN system 160 may provide this information to an application function in core network 130 (e.g., an OHRIN AF), which may then forward such information to UE devices 110 when the UE devices 110 are out of their home region, such as in a different state, country, etc.

In some implementations, the information provided to UE devices 110 may correspond to particular information and/or types of information requested by UE devices 110. For example, UE device 110-1 may interface with OHRIN system 160 and the user associated with UE device 110-1 may select particular types of information of interest that will be provided to UE device 110-1 when the UE device 110-1 is located outside its home region, as described in detail below. In some implementations, OHRIN system 160 and/or the telecommunications service provider associated with core network 130 and/or access network 120 may be paid a fee when a UE device 110 subscribes to receiving notifications provided by OHRIN system 160, as described in detail below.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120, core networks 130, data networks 150 and OHRIN systems 160. Environment 100 may also include elements such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
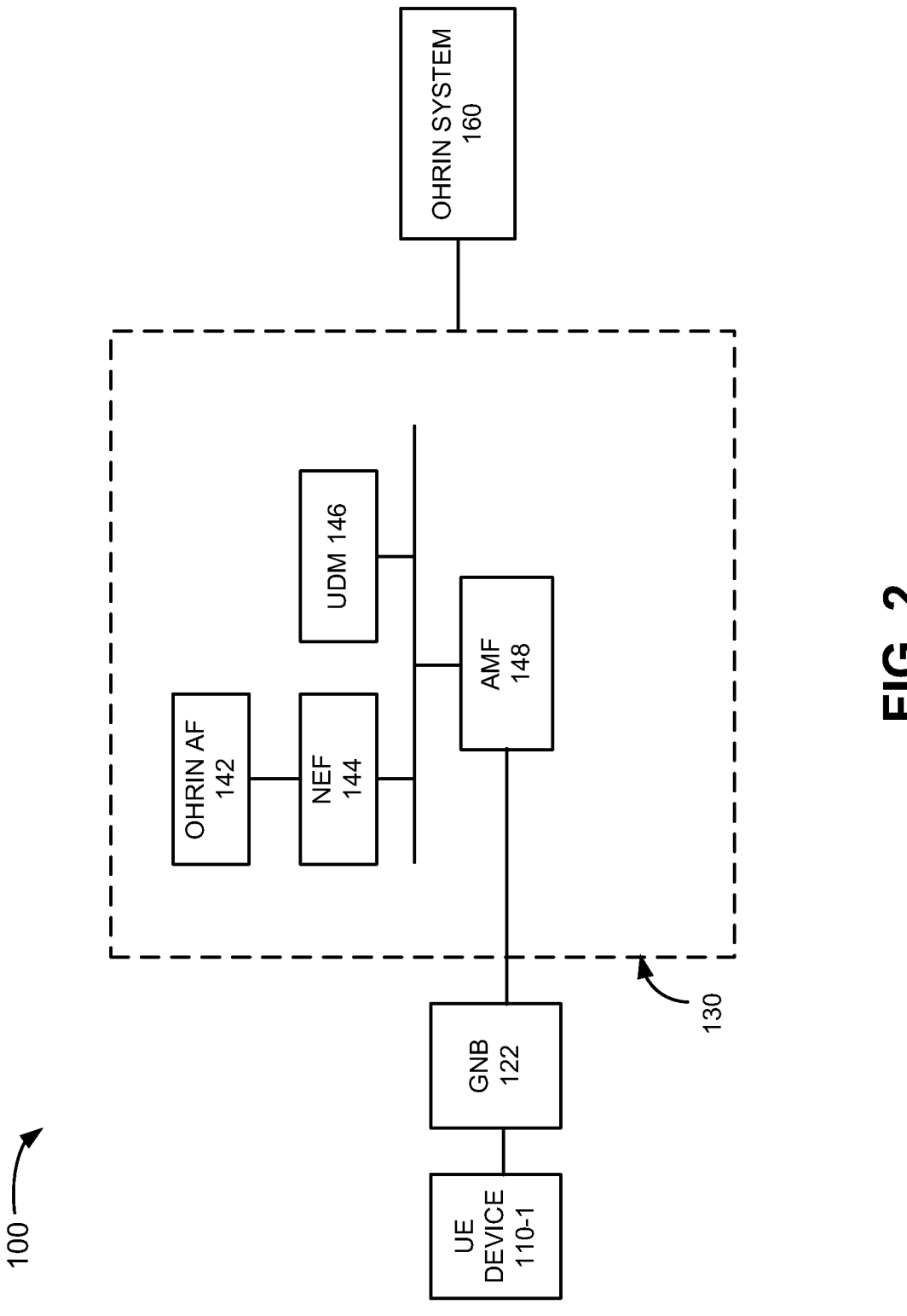
FIG. 2 is a block diagram of components implemented in the environment of FIG. 1 in accordance with an exemplary implementation.

FIG. 2 illustrates a portion of environment 100, including elements implemented in core network 130 in accordance with an exemplary implementation. Referring to FIG. 2, network devices 140 in core network 130 include OHRIN application function (AF) 142, network exposure function (NEF) 144, unified data management (UDM) function 146 and access and mobility management (AMF) function 148. It should be understood that core network 130 may include other elements/functions, such as a UPF, UDR, PCF, etc., and/or differently arranged elements. Environment 100 also includes UE device 110-1, wireless station 122 (depicted as gNB 122).

As illustrated in FIG. 2, UE device 110-1 may connect to core network 130 via wireless station 122, shown in FIG. 2 as gNB 122. OHRIN system 160 may also connect to elements in core network 130, such as OHRIN AF 142, to provide information that will be transmitted to UE devices 110.

OHRIN AF 142 may include an application function that interfaces with OHRIN system 160 to receive notification information that will be provided to UE devices 110 based on the location of UE devices 110. For example, a number of OHRIN AFs 142 may be distributed in environment 100 to provide notifications to UE devices 110 based on the location of UE devices 110. Each OHRIN AF 142 may receive the notification information from one or more OHRIN systems 160 that may also be distributed within environment 100.

NEF 144 may expose capabilities and events to other network functions (NFs), including third party NFs, application functions (AFs) such as OHRIN AF 142, edge computing NFs, and/or other types of NFs. Furthermore, NEF 144 may secure provisioning of information from external applications to core network 130, translate information between core network 130 and devices/networks external to core network 130, support a Packet Flow Description (PFD) function, and/or perform other types of network exposure functions.

UDM 146 may maintain subscription information for UE devices 110, manage subscriptions, generate authentication credentials, handle user identification, perform access authorization based on subscription data, perform network function registration management, maintain service and/or session continuity by maintaining assignment of an SMF (not shown) for ongoing sessions, support Short Message Service (SMS) delivery, support lawful intercept functionality, and/or perform other processes associated with managing user data. In one implementation, UDM 146 may maintain subscription information for UE devices 110 subscribing to OHRIN services.

AMF 148 may perform registration management, connection management, reachability management, mobility management, lawful intercepts, SMS transport between UE device 110 and other network functions, session management messages transport between UE device 110 and other network functions, such as an SMF (not shown), access authentication and authorization, location services management, functionality to support non-3GPP access networks, and/or other types of management processes.

Environment 100 illustrated in FIG. 2 may include additional elements and/or NFs that are not illustrated. Such elements and/or NFs may provide security, authentication and authorization, network polices, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
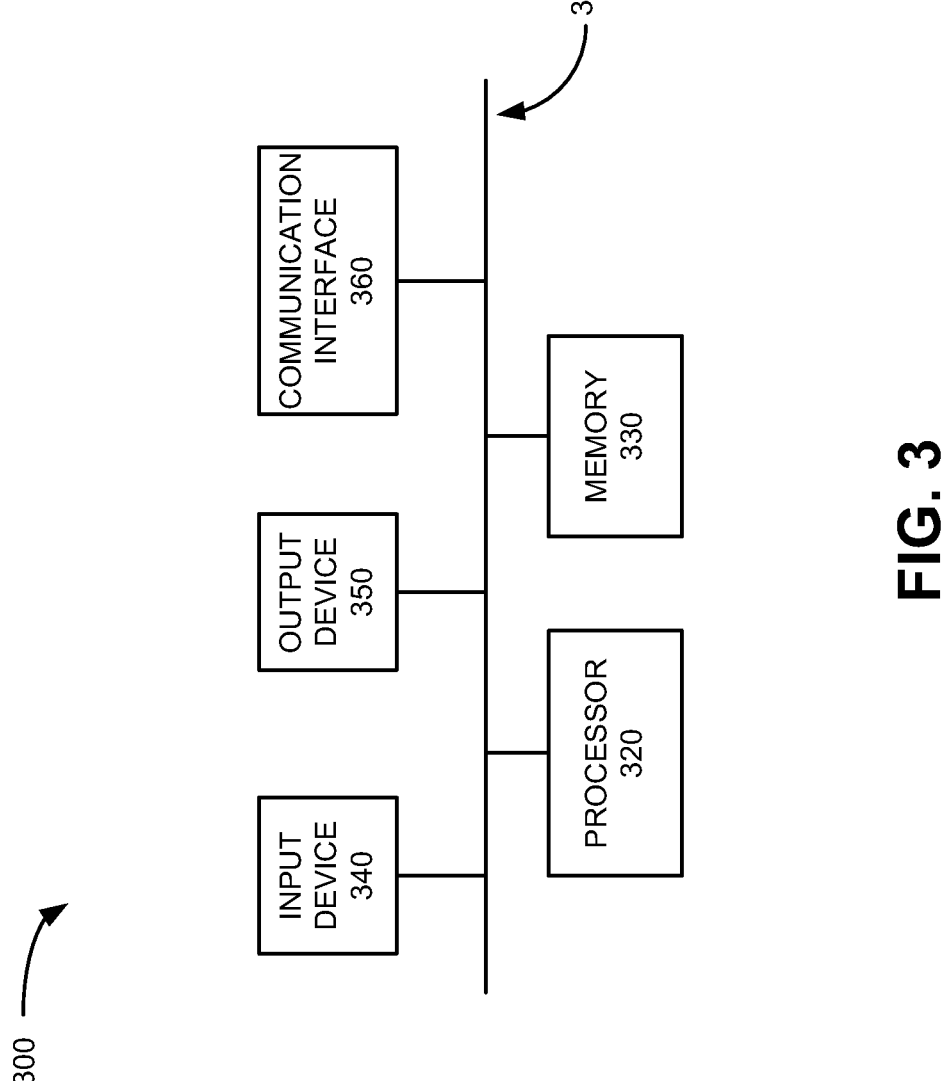
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be included in devices in environment 100, such as UE device 110, wireless station 122, network devices 140, such as OHRIN AF 142, NEF 144, UDM 146 and AMF 148, OHRIN system 160 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3. Bus 310 may connect the elements illustrated in FIG. 3. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

FIG. 4 is a flow diagram illustrating processing associated with UE devices 110 registering for OHR information notifications. Processing may begin with a user interacting with OHRIN system 160. For example, a user at UE 110-1 may connect to OHRIN system 160 (or OHRIN AF 142) and OHRIN system 160 may provide a graphical user interface (GUI) that allows the user to select a home region. As described previously, the home region may be one or more of a city, state, country, etc., corresponding to the user's home location. In other implementations, the home region may be more or less granular, such as a portion of a state (e.g., the eastern portion of state), a region that may include several states (e.g., New England), etc.

Assume that the user selects the home region (block 410). For example, if the user wishes to receive domestic OHR notifications, the user may select a particular state as the home region. As an example, if the user lives in Dallas, Texas, the user may select Texas as the home region or Dallas, Texas as the home region. If the user wishes to only receive international OHR notifications, the user can select a country (e.g., the United States, Canada, etc.) as the user's home region. If the user wishes to receive both domestic and international OHR notifications, the user may select both the city/state and country (e.g., Texas, United States) as the home region. In each case, the user at UE device 110-1 selects the home region, and OHRIN system 160 receives and stores the selection (block 410).

After selecting the home region, OHRIN system 160 may confirm that the user wants to receive domestic and/or international OHR notifications. OHRIN system 160 may also provide a GUI that provides a listing of types of content for which the user would like to receive notifications. For example, the listing may include health related threats or conditions, weather forecasts, current news events, government or jurisdictional regulations or laws, types of telecommunications service available or not available (e.g., 5G service, 5G mmWave service, 4G LTE service), etc. Assume that the user selects from the list of different types of content (block 420). OHRIN system 160 receives the selection(s) and stores the selection(s) (block 420).

OHRIN system 160 also stores an identifier for UE device 110-1, such as an external identifier that identifies UE device 110-1, mobile station international subscriber directory number (MSISDN) associated with UE device 110, or other identifier that uniquely identifies UE device 110-1 (block 430). OHRIN system 160 may similarly interact with other UE devices 110 that elect to receive and/or subscribe to services provided by OHRIN system 160. For example, in some implementations, users may subscribe to notifications and/or pay a monthly fee associated with receiving OHR notifications. In each case, OHRIN system 160 stores the UE identifier along with the user's home region and types of content selected by the user (block 430).

Each AMF 148 in core network 130 may also store tracking area identities or identifiers (TAIs) mapped to a city, state and country (block 440). For example, if a particular AMF 148 supports 15 TAIs, network personnel managing core network 130 may store mappings from each of the 15 TAIs to a particular city, state and country corresponding to the location associated with the particular TAI (e.g., Dallas, Texas, USA). Based on the geography, multiple TAIs may be mapped to the same city, state and/or country.

OHRIN system 160 may also send UE 110 identifier information, along with UE 110's home region information and selected notifications to NEF 144 (block 450). For example, OHRIN system 160 may send a request OHR notification application programming interface (API) to NEF 144 with a list of UE devices 110 (e.g., external IDs, MSISDNs, etc.), along with the UE device 110's home region information and content selections. In response to receiving the UE device 110 information, NEF 144 forwards the OHR notification request to UDM 146 (block 450). In some implementations, a UDR may be co-located with UDM 146. UDM 146 (or UDM/UDR 146) may then send the OHRIN request for each UE to AMF 148 (block 460). As described above, AMF 148 may store each UE's home region in the UE's context data, along with the selected content(s) (block 460). In this manner, UE devices 110 may elect or subscribe to services provided by OHRIN system 160 and receive information notifications when the UE device 110 is outside its home region, as described below.

Figure 5:
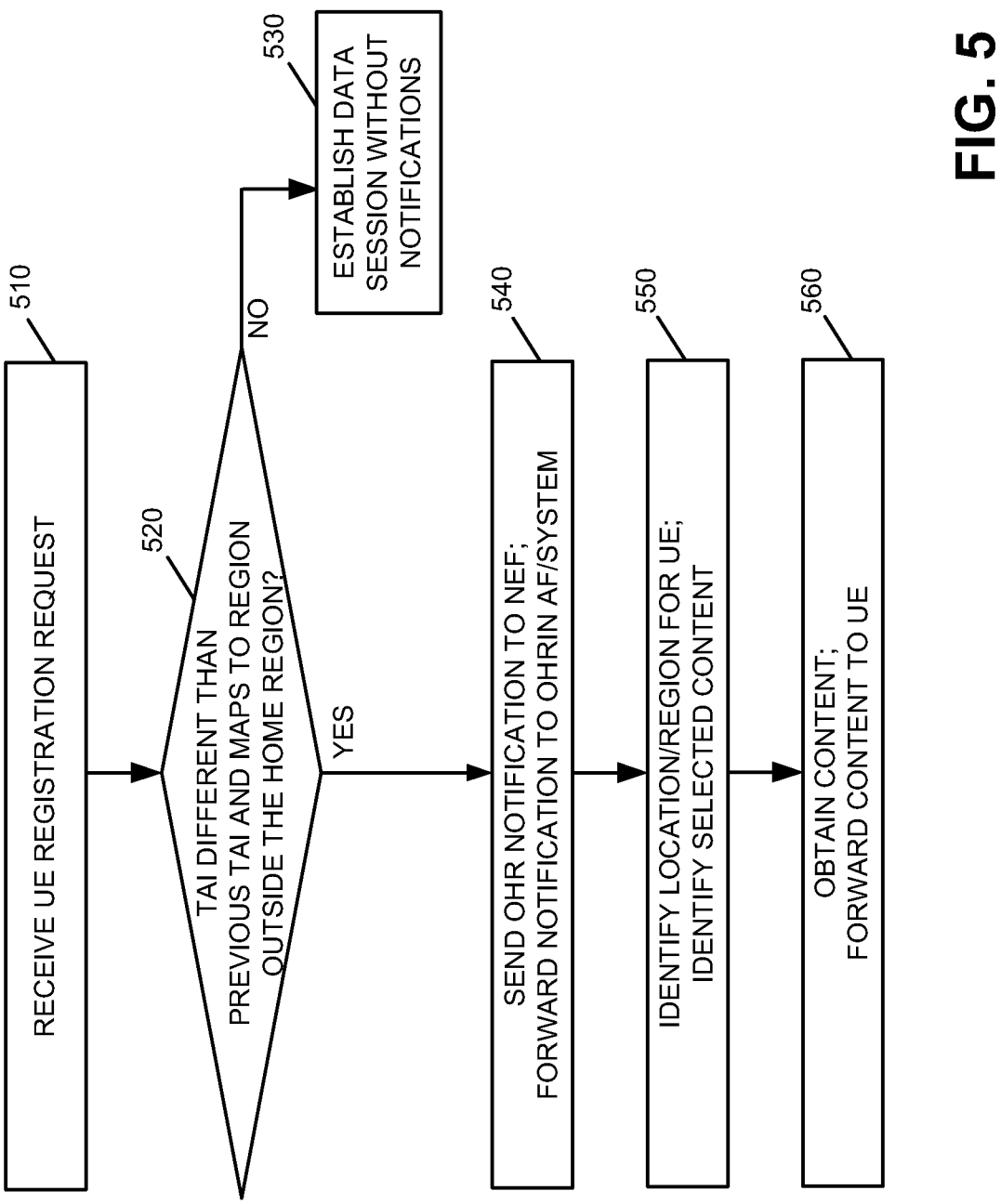
FIG. 5 is a flow diagram illustrating processing associated with receiving information notifications in accordance with an exemplary implementation.
Figure 6:
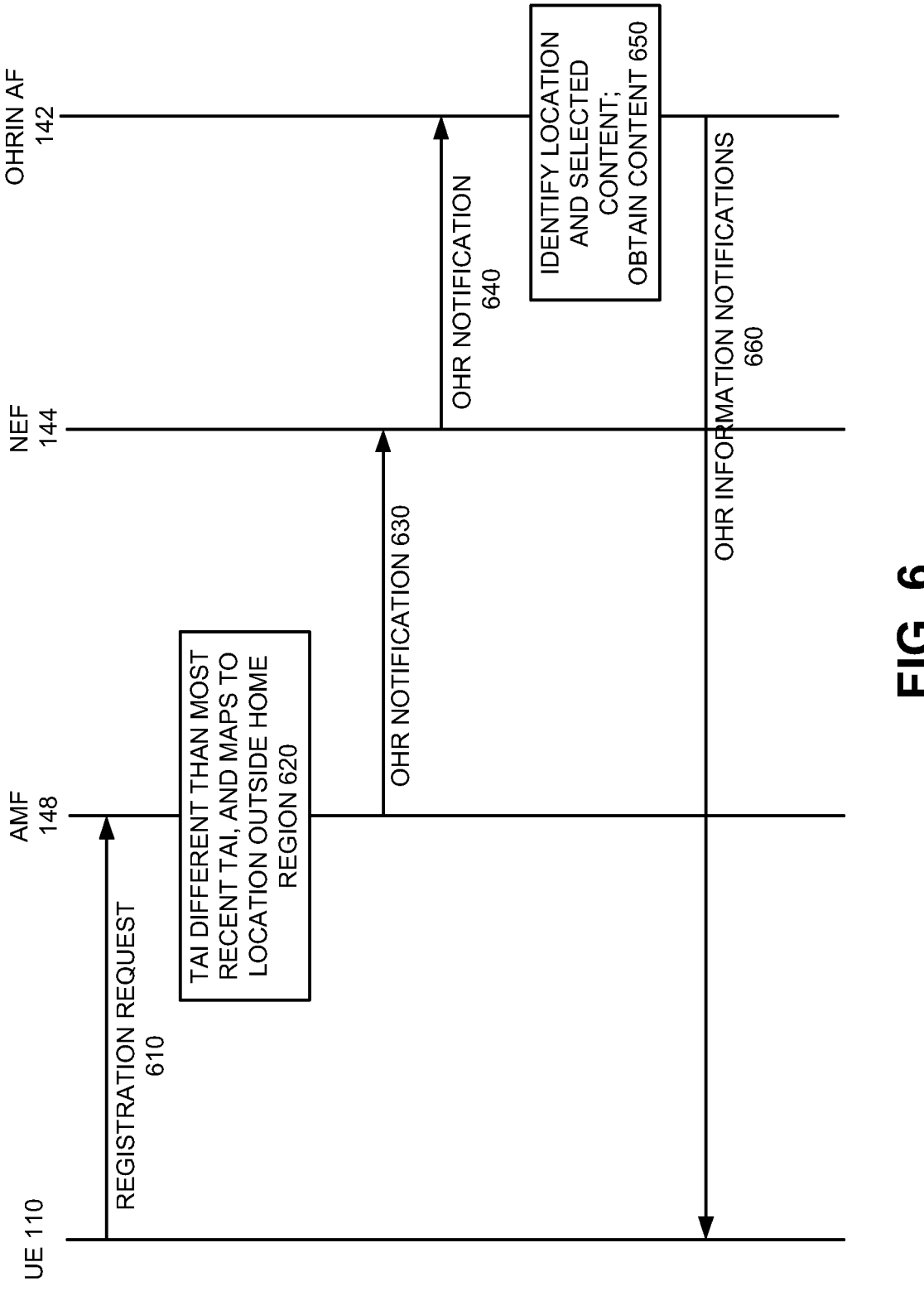
FIG. 6 is an exemplary signal flow diagrams associated with the processing of FIG. 5.

FIG. 5 illustrates processing associated with providing OHR notifications in accordance with an exemplary implementation, and FIG. 6 is an exemplary signal flow diagram associated with the processing of FIG. 5. Processing may begin with UE 110 transmitting a registration request to core network 130 via access network 120 (e.g., wireless station 122). The registration request may be received by AMF 148 (block 510; FIG. 6, 610). As described previously, AMF 148 stores TAIs and mappings of the TAIs to city, state and/or country information. In an exemplary implementation, AMF 148 may also store TAI information associated with a previous registration request from UE device 110. For example, AMF 148 may store a TAI associated with UE device 110-1's most recent registration request for a protocol data unit (PDU) session. Storing the information regarding the most recent registration request may allow UE device 110-1 to receive OHR notifications only once when the user is outside the home region, as described below.

AMF 148 may then determine if the TAI in the registration request is different from the TAI associated with UE device 110's previous or most recent registration request, and whether the TAI maps to a home region that is not the same as the UE 110's home region (block 520; FIG. 6, block 620). For example, if the TAI value in the registration request is the same as the previous TAI value or the TAI indicates that UE device 110-1 is located in the home region (block 520—no), the data session may be established with no OHR notifications being sent (block 530).

If, however, AMF 148 determines that the TAI in the previous registration request from UE 110-1 included a TAI value that is different from the TAI value included in the current registration request (received at block 510), and that the TAI in the registration request maps to a region that is different than UE device 110-1's home region (block 520—yes), this indicates that UE 110 is outside the home region and has not previously had a session, such as a PDU session, while in the current location. In this case, AMF 148 may transmit an OHR notification message to NEF 144 (FIG. 5, 540; FIG. 6, 630). NEF 144 may then forward the OHR notification to OHRIN AF 142 (block 540; FIG. 6, 640). In alternative implementations, NEF 144 may forward the OHR notification to OHRIN system 160.

In either case, OHRIN AF 142 receives the notification, identifies the region in which UE device 110 is located, such as the city, state and/or country (block 550; FIG. 6, 650). OHRIN AF 142 may also identify the particular types of notification that the user at UE device 110 selected to receive (block 550; FIG. 6, 650). OHRIN AF 142 may then obtain the relevant selected content, such as obtain the relevant content from OHRIN system 160 (block 560; FIG. 6, 650). OHRIN AF 142 may then provide a notification with the relevant content to UE device 110-1 (block 560; FIG. 6, 660).

For example, if weather related notifications have been selected, OHRIN AF 142 may transmit weather notifications associated with the location of UE device 110-1 to UE device 110-1 via an SMS message. If types of telecommunication services information was selected, OHRIN AF 142 may indicate whether 5G coverage or other types of coverage are available in the region in which UE device 110-1 is currently located, the type of 5G coverage available (e.g., mmWave coverage), etc. In still other instances, if health information was selected OHRIN AF 142 may provide information regarding the flu, Covid or other medical issues that may be currently relevant in the particular region. In still other implementations, if governmental regulation related information was selected, OHRIN AF 142 may provide information indicating particular government regulations that may be particular to the particular state, country, etc. For example, regulations regarding isolation requirements associated with Covid may be provided.

As described above, the informational notifications may be provided to UE device 110-1 when a PDU session is established. By checking the TAI with the previous, most recent TAI associated with a data session, AMF 148 and/or other elements in core network 130 may avoid providing the same notifications each time a user establishes a data session when outside his/her home region. This may help avoid unnecessary messaging in environment 100. However, in some implementations, AMF 148 may check whether the TAI is the same as the most recent TAI associated with a registration request only when the previous data session is within a predetermined period of time from a current registration request (e.g., seven days, 30 days, etc.). In this manner, if a user is away from his/her home region for an extended period of time, UE device 110-1 may receive multiple notifications associated with the selected types of content after a period of time has passed.

Implementations described herein provide OHR notifications that may be of interest to users. For example, by allowing the users to select the types of content for the notifications, the notifications are more likely to be of interest to the users. In addition, by providing the notifications via SMS messages or other types of messages, the notifications may be provided in a convenient manner to the users. This may allow a network service provider to provide enhanced services to users.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with UE devices 110 receiving SMS messages with OHR notification information. In other implementations, OHRIN AF 142 may provide other types of messaging, such as email messages, with the OHR notification information. In still other implementations, OHRIN AF 142 may provide an SMS or email notification that indicates that notifications of interest may be obtained by selecting a particular link (e.g., provided in the SMS or email message), accessing a particular website, etc. In this manner, the initial message may indicate that notifications are available, and allow the user to access the actual notifications at a time of his/her choosing.

In addition, features have been described with respect to providing OHR notifications using elements in core network 130. In other implementations, similar processing may be performed in other portions of environment 100, such as in a Multi-access Edge Computing (MEC) platform located, for example, between access network 120 and core network 130.

Further, while series of acts have been described with respect to FIGS. 4 and 5 and signal flows with respect to FIG. 6, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, from a user equipment (UE) device, a registration request;
   determining whether the UE device is not in a home region associated with the UE device, and whether information included in the registration request indicates that the UE device is in a different location than a location associated with a most recent registration request;
   in response to determining that the UE device is not in the home region associated with the UE device and the UE device is in a different location than the location associated with a most recent registration request, transmitting a message to a notification device;
   identifying a type of notification information to be provided to the UE device; and
   transmitting, by the notification device, notification information to the UE device based on the identified type of notification information.

2. The method of claim 1, wherein the identifying a type of notification information to be provided to the UE device comprises:
   providing, by the notification device, a graphical user interface (GUI) that provides a plurality of selections for types of notification information; and
   receiving, from the UE device, at least one selection via the GUI.

3. The method of claim 2, further comprising:
   identifying, by the notification device, the at least one selection;
   identifying content corresponding to the at least one selection, wherein the transmitting notification information comprises:
   transmitting, via a short message service (SMS) message, the identified content to the UE device.

4. The method of claim 1, further comprising:
   receiving, from the UE device at least one of a city, state or country information identifying the home region.

5. The method of claim 4, further comprising:
   identifying content relevant to the at least one of city, state or country, wherein the transmitting notification information comprises:

transmitting the notification information based on the identified at least one of the city, state or country.

6. The method of claim 1, wherein the determining comprises:

identifying a tracking area identity (TAI) included in the registration request; and determining if the TAI maps to at least one of a city, state or country that is not associated with the home region associated with the UE device.

7. The method of claim 1, further comprising:

forwarding the registration request to an access and mobility management function (AMF) included in a Fifth Generation (5G) network, wherein the determining is performed by the AMF.

8. The method of claim 7, further comprising:

storing, by the AMF, mappings from a plurality of TAIs to at least one of a city, state or country.

9. The method of claim 1, wherein the transmitting the message to a notification device comprises:

transmitting, by an AMF, an out-of-home region (OHR) message to a network exposure function (NEF); and forwarding, by the NEF, the OHR message to the notification device.

10. The method of claim 1, wherein the identifying a type of notification information comprises identifying at least one of weather or news associated with a location of the UE device.

11. A system, comprising:

at least one device configured to:

receive, from a user equipment (UE) device, a registration request;

determine whether the UE device is not in a home region associated with the UE device;

determine whether information included in the registration request indicates that the UE device is in a different location than a location associated with a most recent registration request;

in response to determining that the UE device is not in the home region associated with the UE device and that the UE device is in a different location than the location associated with a most recent registration request, transmit a message to a notification device;

identify a type of notification information to be provided to the UE device; and transmit notification information to the UE device based on the identified type of notification information.

12. The system of claim 11, wherein the at least one device comprises an access and mobility management (AMF) function, a network exposure function (NEF) and an out-of-home region (OHR) application function.

13. The system of claim 11, wherein when identifying the type of notification information to be provided to the UE device, the at least one device is further configured to:

provide a graphical user interface (GUI) that provides a plurality of selections for types of notification information; and receive, from the UE device, at least one selection via the GUI.

14. The system of claim 13, wherein the at least one device is further configured to:

identify the at least one selection; and identify content corresponding to the at least one selection, wherein when transmitting notification information, the at least one device is further configured to:

transmit, via a short message service (SMS) message, the identified content to the UE device.

15. The system of claim 11, wherein the at least one device is further configured to:

receive, from the UE device, information identifying at least one of a city, state or country corresponding to the home region.

16. The system of claim 15, wherein the at least one device is further configured to:

identify content relevant to the at least one of city, state or country, wherein when transmitting notification information, the at least one device is configured to:

transmit the notification information based on the identified at least one of the city, state or country.

17. The system of claim 11, wherein when determining whether the UE device is not in the home region associated with the UE device, the at least one device is configured to:

identify a tracking area identity (TAI) included in the registration request; and determine if the TAI maps to at least one of a city, state or country that is not associated with the home region associated with the UE device.

18. The system of claim 11, wherein when transmitting a notification, the at least one device is configured to:

transmit the notification information or a notice indicating that notification information is available.

19. The system of claim 11, wherein when identifying a type of notification information, the at least one device is further configured to:

identify at least one of weather or news associated with a location of the UE device.

20. The system of claim 11, wherein the at least one device comprises an access and mobility management function (AMF), a network exposure function (NEF) and an information notification application function.

* * * * *